(12) United States Patent
Xu et al.

(10) Patent No.: US 11,176,337 B2
(45) Date of Patent: Nov. 16, 2021

(54) PROXIMITY SMART CARD AND METHOD FOR OPERATING PROXIMITY SMART CARD

(71) Applicant: E Ink Holdings Inc., Hsinchu (TW)

(72) Inventors: Jia-Hong Xu, Hsinchu (TW); Chuen-Jen Liu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/017,701

(22) Filed: Sep. 11, 2020

(65) Prior Publication Data

US 2021/0150160 A1    May 20, 2021

(30) Foreign Application Priority Data

Nov. 19, 2019 (TW) ................. 108141915

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .................. G06K 19/0723; G06K 7/10366
USPC ........................................................ 235/451
See application file for complete search history.

(56) References Cited

U.S. PATENT DOCUMENTS

| | | | |
|---|---|---|---|
| 8,583,179 B2 | 11/2013 | Rizzo et al. | |
| 8,622,312 B2 | 1/2014 | Norair | |
| 8,820,649 B2 | 9/2014 | Goldman et al. | |
| 8,910,879 B2 | 12/2014 | Goldman et al. | |
| 8,942,628 B2 | 1/2015 | Haverinen | |
| 8,964,298 B2 | 2/2015 | Haddick et al. | |
| 9,124,305 B2 | 9/2015 | Burrell et al. | |
| 9,224,084 B2 | 12/2015 | Warther | |
| 9,335,849 B2 | 5/2016 | Tsai | |
| 9,356,335 B2 | 5/2016 | Li et al. | |
| 9,760,883 B1 | 9/2017 | Wade | |
| 9,761,091 B2 | 9/2017 | Turocy et al. | |
| 9,762,715 B2 | 9/2017 | Saarisalo | |
| 9,843,891 B2 | 12/2017 | Moshfeghi | |

(Continued)

FOREIGN PATENT DOCUMENTS

| | | |
|---|---|---|
| CN | 101770594 | 7/2010 |
| CN | 103067058 | 4/2013 |

(Continued)

*Primary Examiner* — Toan C Ly
(74) *Attorney, Agent, or Firm* — JCIPRNET (57) ABSTRACT

A proximity smart card including a card body, a first integrated circuit, a second integrated circuit, and a display element is provided. The first integrated circuit is disposed on the card body. The first integrated circuit is configured to receive a request command from the card reader, and output a first response command to the card reader. The second integrated circuit is disposed on the card body. The second integrated circuit is configured to receive the request command from the card reader, and delay an output of a second response command to the card reader. The display element is disposed on the card body. The second integrated circuit transmits to-be-displayed information to the display element. The display element displays an image according to the to-be-displayed information. In addition, a method for operating a proximity smart card is also provided.

18 Claims, 6 Drawing Sheets

(56) References Cited

U.S. PATENT DOCUMENTS

| | | | |
|---|---|---|---|
| 9,858,453 | B2 | 1/2018 | Moon et al. |
| 9,922,619 | B2 | 3/2018 | Konanur et al. |
| 9,936,337 | B2 | 4/2018 | Lamba et al. |
| 9,978,058 | B2 | 5/2018 | Wurmfeld et al. |
| 9,998,176 | B2 | 6/2018 | Ravani et al. |
| 10,148,321 | B2 | 12/2018 | Jang et al. |
| 10,237,193 | B2 * | 3/2019 | Chen .................. H04W 72/10 |
| 2012/0287091 | A1 | 11/2012 | Huang et al. |
| 2013/0080238 | A1 | 3/2013 | Kelly et al. |
| 2013/0127980 | A1 | 5/2013 | Haddick et al. |
| 2013/0331031 | A1 * | 12/2013 | Palin .................. H04W 8/005 455/41.2 |
| 2014/0374474 | A1 | 12/2014 | Huang et al. |
| 2016/0132865 | A1 | 5/2016 | Park et al. |
| 2016/0342297 | A1 | 11/2016 | Ellwood |
| 2018/0121866 | A1 | 5/2018 | Higham et al. |
| 2018/0315048 | A1 | 11/2018 | Xiu et al. |
| 2018/0359017 | A1 | 12/2018 | Kwon et al. |
| 2018/0365669 | A1 | 12/2018 | Rossl |
| 2019/0043038 | A1 | 2/2019 | Jang et al. |
| 2019/0058243 | A1 | 2/2019 | Wei |

FOREIGN PATENT DOCUMENTS

| | | |
|---|---|---|
| CN | 204904316 | 12/2015 |
| TW | M427626 | 4/2012 |

\* cited by examiner

PROXIMITY SMART CARD AND METHOD FOR OPERATING PROXIMITY SMART CARD

CROSS-REFERENCE TO RELATED APPLICATION

This application claims the priority benefit of Taiwan application serial no. 108141915, filed on Nov. 19, 2019. The entirety of the above-mentioned patent application is hereby incorporated by reference herein and made a part of this specification.

BACKGROUND OF THE INVENTION

Field of the Invention

The disclosure relates to a smart card and a method for operating the smart card, and in particular, to a proximity smart card and a method for operating the proximity smart card.

Description of Related Art

Currently, near-field communication integrated circuit (NFC IC) cards are not generally designed as a dual NFC IC architecture, mainly in order to avoid troubles in the near-field communication. If the dual NFC IC architecture needs to be used in a card, an anti-collision mechanism needs to be used in a reader-writer to prevent the two NFC ICs from interfering with each other. Therefore, most users use only a single NFC IC architecture in their smart cards to avoid complex anti-collision mechanisms and mutual interference of the two NFC ICs.

SUMMARY OF THE INVENTION

The invention provides a proximity smart card and a method for operating the proximity smart card. The proximity smart card has at least two NFC IC architectures and NFC ICs can be prevented from interfering with each other.

The proximity smart card in the invention includes a card body, a first integrated circuit, a second integrated circuit, and a display element. The first integrated circuit is disposed on the card body. The first integrated circuit is configured to receive a request command from the card reader, and output a first response command to the card reader. The second integrated circuit is disposed on the card body. The second integrated circuit is configured to receive the request command from the card reader, and delay an output of a second response command to the card reader. The display element is disposed on the card body. The second integrated circuit transmits to-be-displayed information to the display element. The display element displays an image according to the to-be-displayed information.

In an embodiment of the invention, the first integrated circuit outputs the first response command to the card reader after a first time. The second integrated circuit outputs the second response command to the card reader after a second time. A duration of the second time is greater than a duration of the first time.

In an embodiment of the invention, the first integrated circuit is an integrated circuit to be read by the card reader. The card reader communicates with the first integrated circuit after receiving the first response command.

In an embodiment of the invention, the second integrated circuit is an integrated circuit to be read by the card reader. After receiving the second response command, the card reader outputs a halt command to the first integrated circuit and communicates with the second integrated circuit.

In an embodiment of the invention, the second integrated circuit transmits the to-be-displayed information to the display element via wireless communication.

In an embodiment of the invention, the first integrated circuit and the second integrated circuit meet a same proximity smart card standard.

In an embodiment of the invention, the first integrated circuit and the second integrated circuit meet different proximity smart card standards.

In an embodiment of the invention, the proximity smart card further includes a third integrated circuit. The third integrated circuit is disposed on the card body. The third integrated circuit is configured to receive the request command from the card reader, and delay an output of a third response command to the card reader.

In an embodiment of the invention, the second integrated circuit outputs the second response command to the card reader after a second time. The third integrated circuit outputs the third response command to the card reader after a third time. A duration of the second time is greater than or less than a duration of the third time.

In an embodiment of the invention, the third integrated circuit is an integrated circuit to be read by the card reader. The card reader communicates with the third integrated circuit after receiving the third response command.

In an embodiment of the invention, the second integrated circuit is an integrated circuit to be read by the card reader. After receiving the second response command, the card reader outputs a halt command to the third integrated circuit and communicates with the second integrated circuit.

In an embodiment of the invention, the display element is an electronic paper display element.

A method for operating a proximity smart card in the invention includes: receiving a request command from a card reader through a first integrated circuit and a second integrated circuit; outputting a first response command to the card reader through the first integrated circuit; delaying an output of a second response command to the card reader through the second integrated circuit; and transmitting to-be-displayed information to a display element through the second integrated circuit, to display an image by using the display element according to the to-be-displayed information.

In an embodiment of the invention, the first integrated circuit is an integrated circuit to be read by the card reader. The method further includes: communicating with the card reader through the first integrated circuit after the first response command is output.

In an embodiment of the invention, the second integrated circuit is an integrated circuit to be read by the card reader. The method further includes: communicating with the card reader through the second integrated circuit and transmitting the to-be-displayed information to the display element through the second integrated circuit after the second response command is output.

In an embodiment of the invention, the method further includes: receiving the request command from the card reader through the third integrated circuit; and delaying an output of a third response command to the card reader through the third integrated circuit.

In an embodiment of the invention, the third integrated circuit is an integrated circuit to be read by the card reader, and the method further includes: communicating with the card reader through the third integrated circuit after the third response command is output.

In an embodiment of the invention, the display element is an electronic paper display element.

Based on the foregoing, in the embodiments of the invention, the second integrated circuit delays the output of the second response command to the card reader to avoid mutual interference with the first integrated circuit.

To make the foregoing features and advantages of the invention clearer and more comprehensible, a detailed description is made below with reference to the accompanying drawings by using embodiments.

DESCRIPTION OF THE EMBODIMENTS

A plurality of embodiments is provided in the following to describe the invention. However, the invention is not limited to the illustrated plurality of embodiments. Appropriate combinations are allowed between the embodiments. The term "coupled" used throughout this specification (including the claims) may refer to any direct or indirect connection means. For example, if a first apparatus is coupled to a second apparatus in the description of this specification, it should be interpreted as follows: The first apparatus may be directly connected to the second apparatus, or the first apparatus may be indirectly connected to the second apparatus by using another apparatus or in some connection means. In addition, the word "signal" may refer to at least one current, voltage, electric charge, temperature, information, electromagnetic wave, or any one or more signals.

Figure 1:
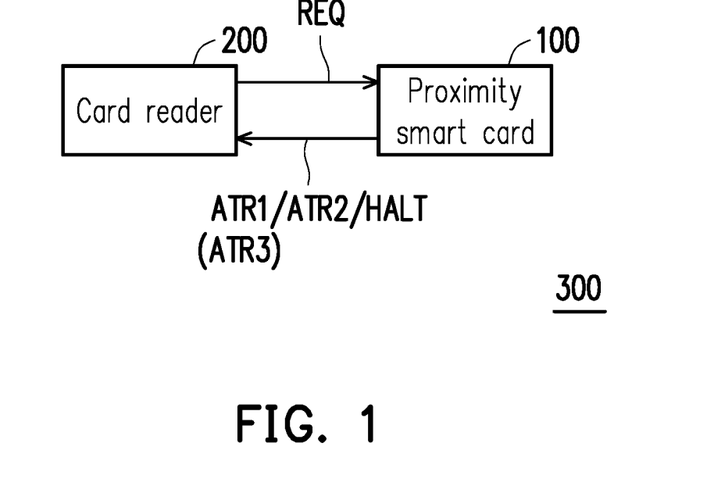
FIG. 1 is an overall schematic diagram of a reading system of a proximity smart card according to an embodiment of the invention.
Figure 2:
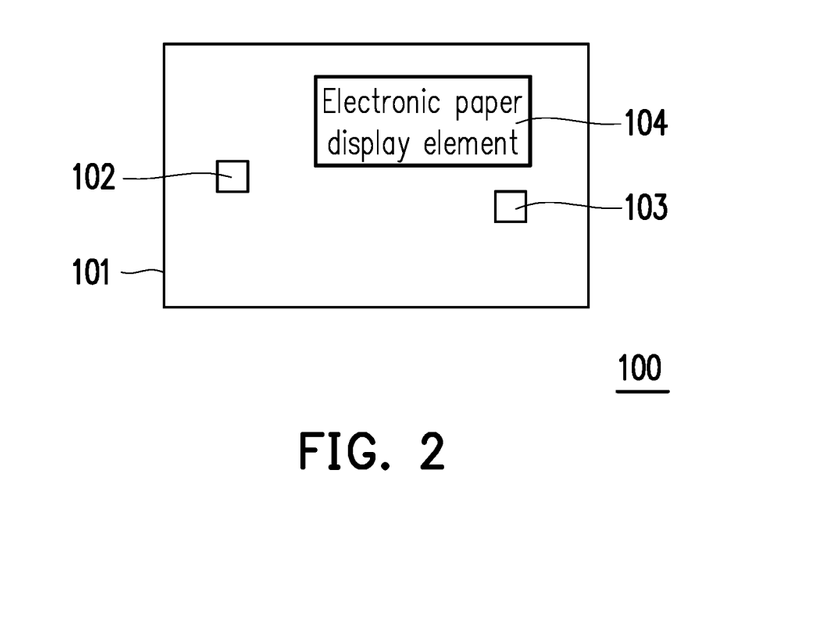
FIG. 2 is an overall schematic diagram of the proximity smart card according to the embodiment of FIG. 1.

FIG. 1 is an overall schematic diagram of a reading system of a proximity smart card according to an embodiment of the invention. FIG. 2 is an overall schematic diagram of the proximity smart card according to the embodiment of FIG. 1. Referring to FIG. 1 and FIG. 2, a reading system 300 in present embodiment includes a proximity smart card 100 and a card reader 200. The proximity smart card 100 is, for example, a proximity integrated circuit card (PICC). The card reader 200 is, for example, a proximity coupling device. The proximity smart card 100 communicates with the card reader 200 through a near-field wireless communication technology.

The proximity smart card 100 includes a card body 101, a first integrated circuit 102, a second integrated circuit 103, and an electronic paper display element 104. The first integrated circuit 102, the second integrated circuit 103, and the electronic paper display element 104 are disposed on the card body 101. The first integrated circuit 102 is an NFC IC generally used in the market, for example, an NFC IC meeting proximity smart card standards such as an EMV, Mifare, and ISO 14443 A/B. The first integrated circuit 102 is applied to financial, transportation, or other general stored-value cards. The second integrated circuit 103 is an NFC IC in communication with the electronic paper display element 104. The second integrated circuit 103 may be an NFC IC meeting proximity smart card standards such as the ISO 14443 A/B and FeliCa. Therefore, the first integrated circuit 102 and the second integrated circuit 103 may meet a same proximity smart card standard or meet different proximity smart card standards. The second integrated circuit 103 transmits to-be-displayed information to the electronic paper display element 104 mainly via wireless communication. The electronic paper display element 104 displays an image according to the to-be-displayed information, for example, displays the information received from the second integrated circuit 103.

In present embodiment, the first integrated circuit 102 and the second integrated circuit 103 are configured to receive a request command REQ from the card reader 200. After receiving the request command REQ, the first integrated circuit 102 outputs a first response command ATR1 to the card reader 200, and the second integrated circuit 103 delays an output of a second response command ATR2 to the card reader 200. In present embodiment, for example, the second integrated circuit 103 delays the output of the second response command ATR2 in a manner in which a delay circuit is disposed in the second integrated circuit 103. The delay circuit may be implemented in a structure of any type of delay circuit in the art. This is not limited in the invention. The implementation may receive sufficient teaching, advice, and implementation descriptions from common knowledge in the art.

Figure 3:
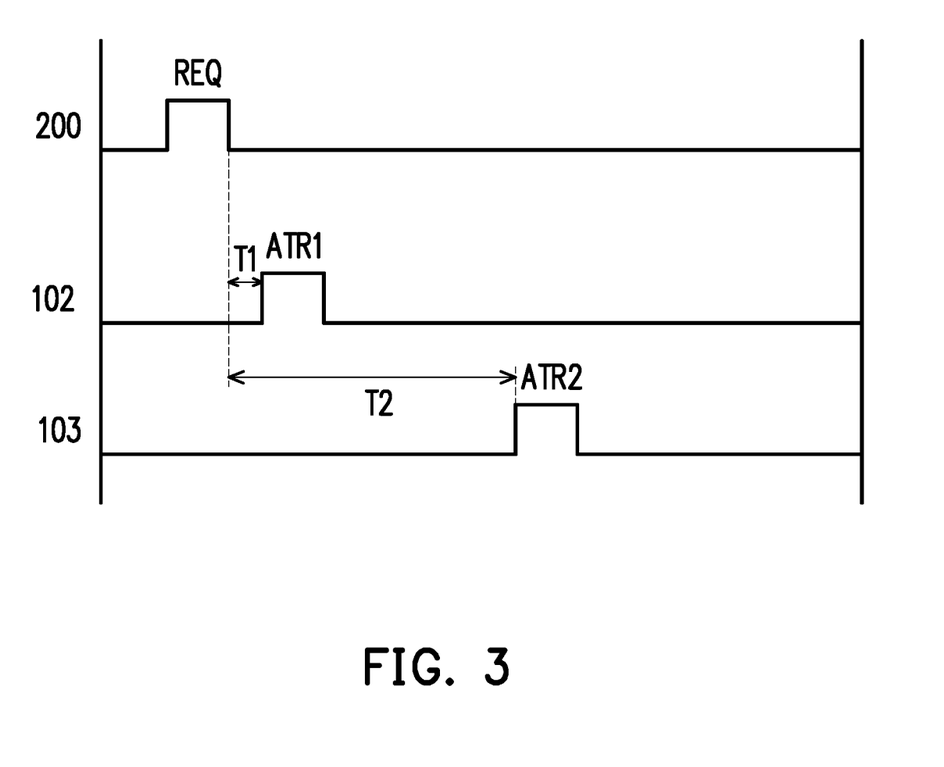
FIG. 3 is an overall schematic diagram of a request command and response commands according to the embodiment of FIG. 1 and FIG. 2.

Specifically, FIG. 3 is an overall schematic diagram of a request command and response commands according to the embodiment of FIG. 1 and FIG. 2. Referring to FIG. 3, the card reader 200 outputs the request command REQ to the first integrated circuit 102 and the second integrated circuit 103. The first integrated circuit 102 outputs the first response command ATR1 to the card reader 200 after a first time T1 at which the request command REQ is received. If the first integrated circuit 102 is an integrated circuit to be read by the card reader 200, the card reader 200 directly communicates with the first integrated circuit 102 after receiving the first response command ATR1.

On the other hand, if information is to be transmitted to the electronic paper display element 104, the first integrated circuit 102 replies with the first response command ATR1 after receiving the request command REQ, and the card reader 200 outputs a halt command HALT to the first integrated circuit 102 to make the first integrated circuit 102 halt. Moreover, the card reader 200 communicates with the second integrated circuit 103 after receiving the second response command ATR2 whose output is delayed. The second integrated circuit 103 is required to delay the output of the second response command ATR2 to the card reader 200 to avoid collision. Therefore, a duration of a second time T2 is greater than a duration of the first time T1.

Figure 4:
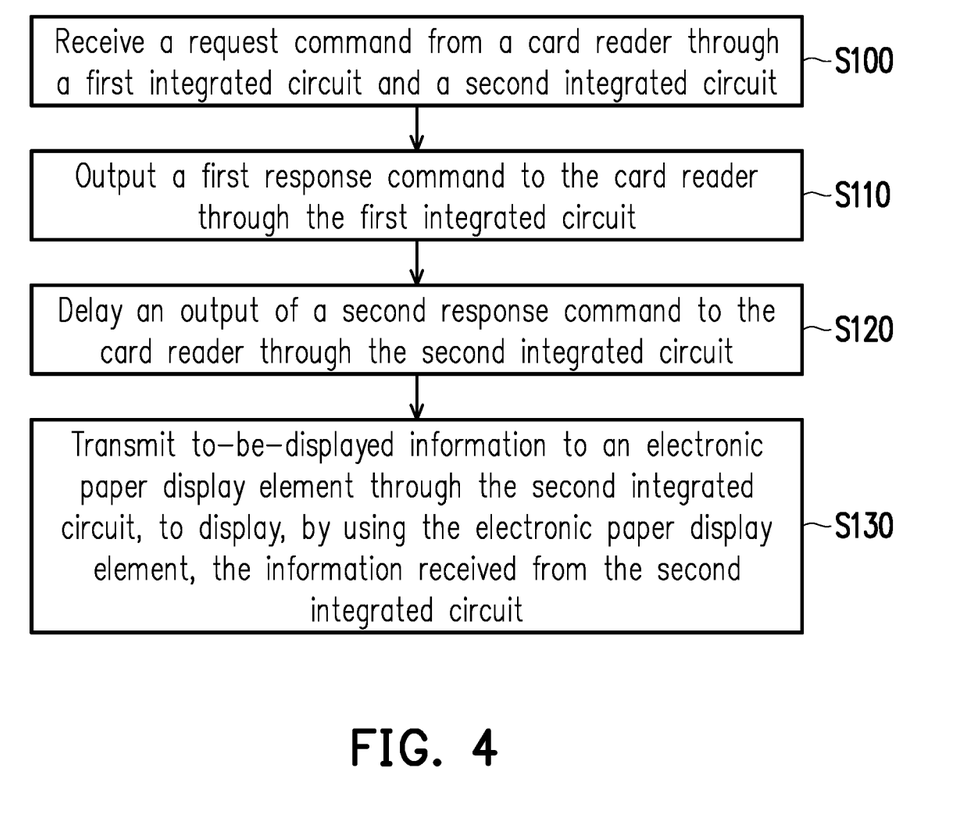
FIG. 4 is a flowchart of steps of a method for operating a proximity smart card according to an embodiment of the invention.

FIG. 4 is a flowchart of steps of a method for operating a proximity smart card according to an embodiment of the invention. Referring to FIG. 1 and FIG. 4, the operating method in present embodiment is applicable to at least the proximity smart card 100 in FIG. 2, which is not limited in the invention. The proximity smart card 100 in FIG. 2 is used as an example. In step S100, the proximity smart card 100 receives the request command REQ from the card reader 200 through the first integrated circuit 102 and the second integrated circuit 103. In step S110, the proximity smart card 100 outputs the first response command ATR1 to the card reader 200 through the first integrated circuit 102. In step S120, the proximity smart card 100 delays the output of the second response command ATR2 to the card reader 200 through the second integrated circuit 103. In step S130, the proximity smart card 100 transmits the to-be-displayed information to the electronic paper display element 104 through the second integrated circuit 103, to display, by using the electronic paper display element 104, the information received from the second integrated circuit 103. In addition, the method for operating a proximity smart card according the embodiment of the invention may receive sufficient teaching, advice, and implementation descriptions from the descriptions of the embodiment in FIG. 1 to FIG. 3.

Figure 5:
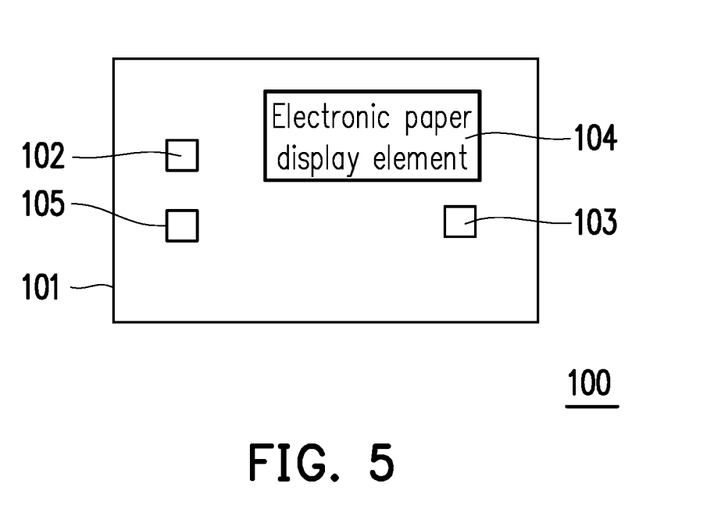
FIG. 5 is an overall schematic diagram of a proximity smart card according to another embodiment of the invention.

Moreover, the invention may also be applied to a case in which the card body 101 is provided with at least three integrated circuits. FIG. 5 is an overall schematic diagram of a proximity smart card according to another embodiment of the invention. The card body 101 in present embodiment is provided with a third integrated circuit 105. When the integrated circuit receives the request command REQ from the card reader 200, the first integrated circuit 102 outputs the first response command ATR1 to the card reader 200. The second integrated circuit 103 delays the output of the second response command ATR2 to the card reader 200. The third integrated circuit 105 delays an output of a third response command ATR3 to the card reader 200. If the third integrated circuit 105 is an integrated circuit to be read by the card reader 200, the card reader 200 directly communicates with the third integrated circuit 105 after receiving the third response command ATR3, and outputs the halt command HALT to the first integrated circuit 102 to make the first integrated circuit 102 halt. If information is to be transmitted to the electronic paper display element 104, the card reader 200 outputs the halt command HALT to the first integrated circuit 102 and/or the third integrated circuit 105 to make the first integrated circuit 102 and/or the third integrated circuit 105 halt. For example, the method in which the integrated circuit delays the output of the response command is as follows: A delay circuit is disposed in each of the second integrated circuit 103 and the third integrated circuit 105.

Figure 6:
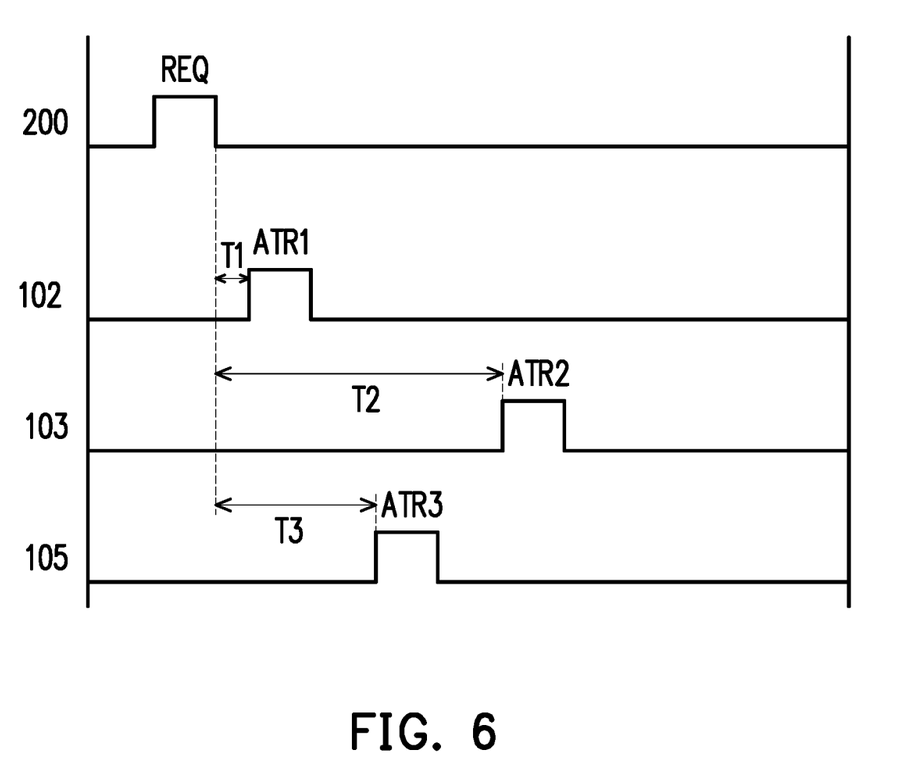
FIG. 6 is an overall schematic diagram of a request command and response commands according to the embodiment of FIG. 5.

FIG. 6 is an overall schematic diagram of a request command and response commands according to the embodiment of FIG. 5. The third integrated circuit 105 outputs the third response command ATR3 to the card reader 200 after a third time T3 at which the request command REQ is received. In this case, a duration of the third time T3 may be greater than the duration of the first time T1 and less than the duration of the second timeT2. Alternatively, the duration of the third time T3 may be greater than the duration of the second time T2. A range of the duration of the third time T3 may be set differently according to the function of the third integrated circuit 105.

Figure 7:
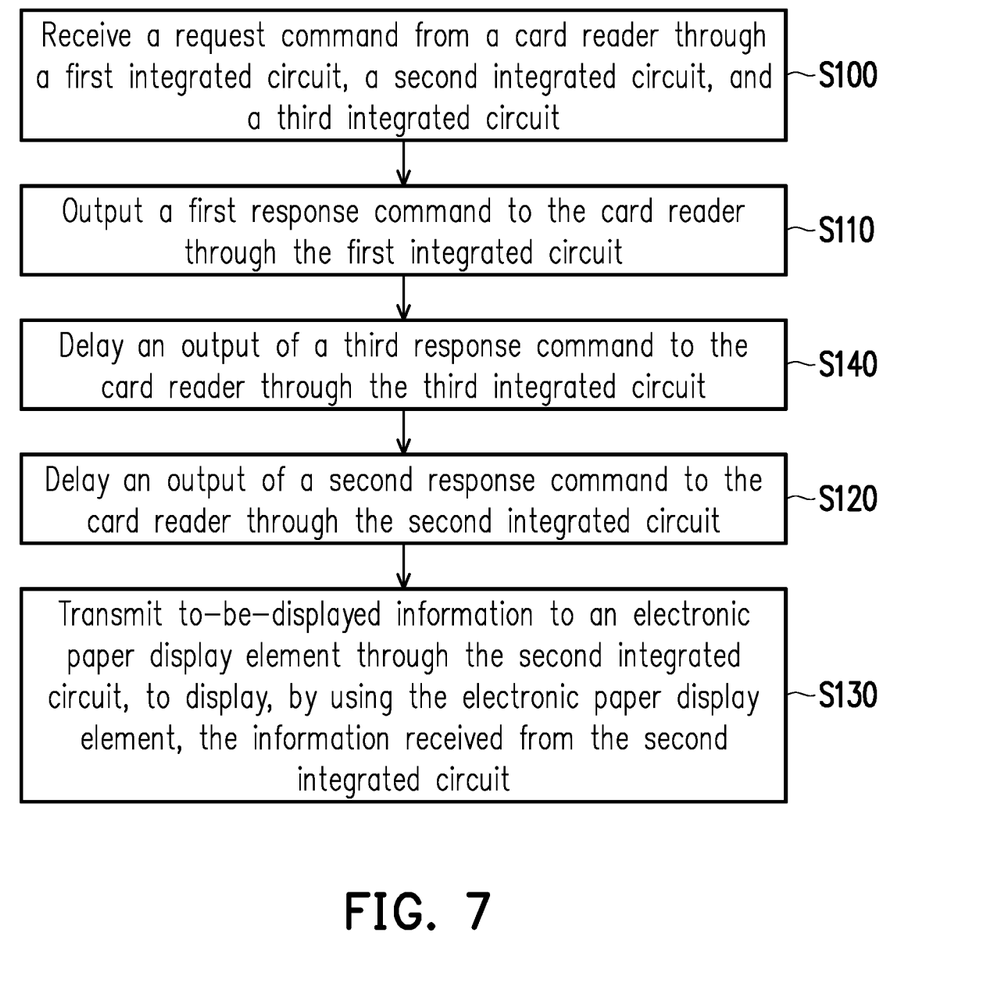
FIG. 7 is a flowchart of steps of a method for operating a proximity smart card according to another embodiment of the invention.

FIG. 7 is a flowchart of steps of a method for operating a proximity smart card according to another embodiment of the invention. When the card body 101 is provided with the third integrated circuit 105, in the embodiment of FIG. 7, another step S140 exists between step S110 and step S120. That is, the proximity smart card 100 delays the output of the third response command ATR3 to the card reader 200 through the third integrated circuit 105.

Figure 8:
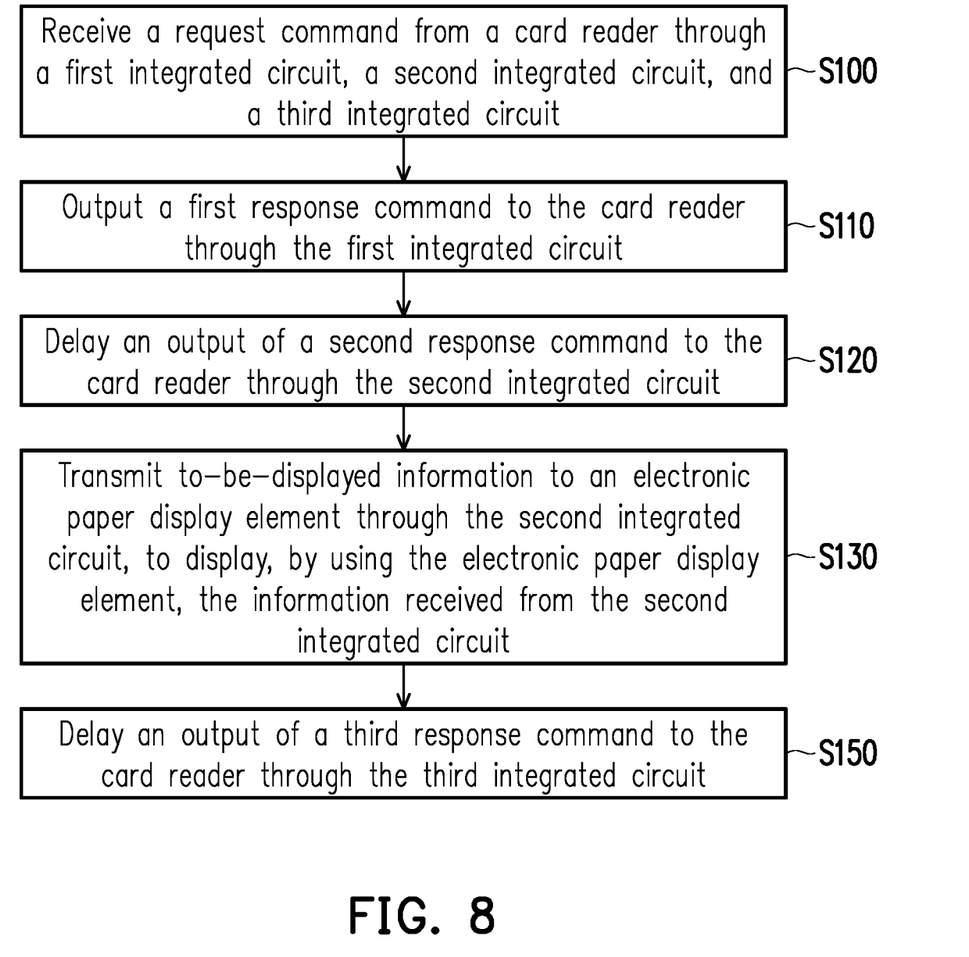
FIG. 8 is a flowchart of steps of a method for operating a proximity smart card according to another embodiment of the invention.

FIG. 8 is a flowchart of steps of a method for operating a proximity smart card according to another embodiment of the invention. When the card body 101 is provided with the third integrated circuit 105, in the embodiment of FIG. 8, another step S150 exists after step S130. That is, the proximity smart card 100 delays the output of the third response command ATR3 to the card reader 200 through the third integrated circuit 105.

Based on the foregoing, in the embodiments of the invention, the proximity smart card combines the electronic paper display element and two NFC ICs, thereby avoiding the trouble on dual-card concurrency. The dual NFC IC architecture uses a same communication protocol or different communication protocols. One of the two NFC ICs is an NFC IC in communication with the electronic paper display element, and the other one is an NFC IC commonly used in the market. The proximity smart card can immediately confirm an integrated circuit when the two NFC ICs operate, which can avoid complex judgment and processing in an anti-collision mechanism.

In addition, the invention also provides an example in which the proximity smart card combines the electronic paper display element and at least three NFC ICs. One of the NFC ICs is an NFC IC in communication with the electronic paper display element, and the other ones are NFC ICs commonly used in the market. In the proximity smart card provided with at least two NFC ICs, the invention may also be used to improve the efficiency of NFC IC communication and avoid the complex judgment and processing in the anti-collision mechanism.

Although the invention has been disclosed with reference to the above embodiments, the embodiments are not intended to limit the invention. A person of ordinary skill in the art may make some variations and improvements without departing from the spirit and scope of the invention. Therefore, the protection scope of the invention should be subject to the appended claims.

What is claimed is:

1. A proximity smart card, comprising:
    a card body;
    a first integrated circuit, disposed on the card body, and configured to receive a request command from a card reader, and output a first response command to the card reader;
    a second integrated circuit, disposed on the card body, and configured to receive the request command from the card reader, and delay an output of a second response command to the card reader; and
    a display element, disposed on the card body, wherein the second integrated circuit transmits to-be-displayed information to the display element, and the display element displays an image according to the to-be-displayed information.

2. The proximity smart card according to claim 1, wherein the first integrated circuit outputs the first response command to the card reader after a first time, the second integrated circuit outputs the second response command to the card reader after a second time, and a duration of the second time is greater than a duration of the first time.

3. The proximity smart card according to claim 1, wherein the first integrated circuit is an integrated circuit to be read by the card reader, and the card reader communicates with the first integrated circuit after receiving the first response command.

4. The proximity smart card according to claim 1, wherein the second integrated circuit is an integrated circuit to be read by the card reader, and after receiving the second response command, the card reader outputs a halt command to the first integrated circuit and communicates with the second integrated circuit.

5. The proximity smart card according to claim 1, wherein the second integrated circuit transmits the to-be-displayed information to the display element via wireless communication.

6. The proximity smart card according to claim 1, wherein the first integrated circuit and the second integrated circuit meet a same proximity smart card standard.

7. The proximity smart card according to claim 1, wherein the first integrated circuit and the second integrated circuit meet different proximity smart card standards.

8. The proximity smart card according to claim 1, further comprising:
a third integrated circuit, disposed on the card body, and configured to receive the request command from the card reader, and delay an output of a third response command to the card reader.

9. The proximity smart card according to claim 8, wherein the second integrated circuit outputs the second response command to the card reader after a second time, the third integrated circuit outputs the third response command to the card reader after a third time, and a duration of the second time is greater than or less than a duration of the third time.

10. The proximity smart card according to claim 9, wherein the third integrated circuit is an integrated circuit to be read by the card reader, and the card reader communicates with the third integrated circuit after receiving the third response command.

11. The proximity smart card according to claim 9, wherein the second integrated circuit is an integrated circuit to be read by the card reader, and after receiving the second response command, the card reader outputs a halt command to the third integrated circuit and communicates with the second integrated circuit.

12. The proximity smart card according to claim 1, wherein the display element is an electronic paper display element.

13. A method for operating a proximity smart card, wherein the proximity smart card comprises a first integrated circuit, a second integrated circuit, and a display element, and the method comprises:
receiving a request command from a card reader through the first integrated circuit and the second integrated circuit;
outputting a first response command to the card reader through the first integrated circuit;
delaying an output of a second response command to the card reader through the second integrated circuit; and
transmitting to-be-displayed information to the display element through the second integrated circuit, to display an image by the display element according to the to-be-displayed information.

14. The method for operating a proximity smart card according to claim 13, wherein the first integrated circuit is an integrated circuit to be read by the card reader, and the method further comprises:
communicating with the card reader through the first integrated circuit after the first response command is output.

15. The method for operating a proximity smart card according to claim 13, wherein the second integrated circuit is an integrated circuit to be read by the card reader, and the method further comprises:
communicating with the card reader through the second integrated circuit and transmitting the to-be-displayed information to the display element through the second integrated circuit after the second response command is output.

16. The method for operating a proximity smart card according to claim 13, wherein the proximity smart card further comprises a third integrated circuit, and the method further comprises:
receiving the request command from the card reader through the third integrated circuit; and
delaying an output of a third response command to the card reader through the third integrated circuit.

17. The method for operating a proximity smart card according to claim 16, wherein the third integrated circuit is an integrated circuit to be read by the card reader, and the method further comprises:
communicating with the card reader through the third integrated circuit after the third response command is output.

18. The method for operating a proximity smart card according to claim 13, wherein the display element is an electronic paper display element.

* * * * *